US007404391B2

(12) United States Patent
Schueler et al.

(10) Patent No.: US 7,404,391 B2
(45) Date of Patent: Jul. 29, 2008

(54) METHOD AND DEVICE FOR OPERATING AN INTERNAL COMBUSTION ENGINE

(75) Inventors: Matthias Schueler, Steinheim (DE); Mohamed Youssef, Nuefringen (DE); Vincent Dautel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 11/605,701

(22) Filed: Nov. 28, 2006

(65) Prior Publication Data

US 2007/0137617 A1 Jun. 21, 2007

(30) Foreign Application Priority Data

Nov. 28, 2005 (DE) ....................... 10 2005 056 519

(51) Int. Cl.

| | |
|---|---|
| ***F02P 5/15*** | (2006.01) |
| ***G06F 19/00*** | (2006.01) |
| ***G01M 19/00*** | (2006.01) |
| ***F02M 25/07*** | (2006.01) |
| ***F02M 7/00*** | (2006.01) |

(52) U.S. Cl. .................... 123/406.24; 73/116; 123/436; 123/568.21; 701/111

(58) Field of Classification Search ............ 123/406.24, 123/436; 73/116; 701/111
See application file for complete search history.

(56) References Cited

U.S. PATENT DOCUMENTS

| | | | | |
|---|---|---|---|---|
| 3,789,816 | A * | 2/1974 | Taplin et al. | 123/436 |
| 4,993,389 | A * | 2/1991 | Ahlborn et al. | 123/436 |
| 5,950,599 | A * | 9/1999 | Rotramel et al. | 123/436 |
| 6,298,838 | B1 * | 10/2001 | Huff et al. | 123/674 |
| 2007/0137289 | A1 * | 6/2007 | Mathews et al. | 73/118.1 |
| 2007/0261669 | A1 * | 11/2007 | Buslepp et al. | 123/406.24 |

* cited by examiner

*Primary Examiner*—T. M Argenbright
(74) *Attorney, Agent, or Firm*—Kenyon & Kenyon LLP

(57) ABSTRACT

A method for controlling an internal combustion engine calculates the generated internal torque for each cylinder on the basis of the signal generated by an angle of rotation sensor for detecting the angle of rotation of the crankshaft, so that a rapid and precise regulation of the torque supplied by the internal combustion engine may be achieved.

20 Claims, 3 Drawing Sheets

METHOD AND DEVICE FOR OPERATING AN INTERNAL COMBUSTION ENGINE

CROSS-REFERENCE TO RELATED APPLICATIONS

The present application claims priority to Application No. 10 2005 056 519.0, filed in the Federal Republic of Germany on Nov. 28, 2005, which is expressly incorporated herein in its entirety by reference thereto.

FIELD OF THE INVENTION

The present invention relates to a method and a control device for operating an internal combustion engine as well as to an internal combustion engine.

BACKGROUND INFORMATION

Internal combustion engines generally use the torque supplied by the internal combustion engine at the crankshaft to control and regulate the internal combustion engine. The reference variable in this control is a setpoint torque. This setpoint torque can be input by the driver via a particular position of the accelerator pedal or by various systems of the motor vehicle such as an electronic stability program, traction control system or the control of an automatic transmission, for example. The control and regulation of the internal combustion engine translates the setpoint torque into corresponding control actions of, for instance, the throttle valve, the ignition timing, fuel-injection blank-outs, etc.

The torque supplied by the internal combustion engine is not measured directly in these internal combustion engines, but calculated via, for instance, a mass air-flow sensor as well as the lambda probe and corresponding models of the internal combustion engine. However, this calculation is sufficiently precise only in the case of Otto engines having manifold injection. In Otto engines having direct gasoline injection or in diesel engines, there is no clear correlation between the air mass aspirated by the internal combustion engine and the torque output by the internal combustion engine.

Compared to an internal combustion engine having manifold injection, in stratified-charge operation (lambda>1) and homogenous lean-mixture operation there are the following changed margin conditions in internal combustion engines having direct gasoline injection (DGI):

The air mass is no measure for the torque supplied by the internal combustion engine since only the injected fuel quantity is determinative of the torque.

A measurement of the exhaust gas composition with the aid of a continuous lambda probe is too imprecise.

The torque-affecting actuating variables are more numerous in internal combustion engines having direct injection. In particular, the start of injection, the exhaust-gas recirculation rate, the lambda value and the position of a throttle valve must be taken into account.

The calculation of torque $M_{eff}$ output by the internal combustion engine on the basis of the aforementioned measured influence variables can therefore be realized only by setting up numerous models and a complicated application of these functions in a control device. Nevertheless, the accuracy of such a determination of the torque supplied by the internal combustion engine is unsatisfactory, so that, for instance, drivability problems of the motor vehicle may arise in interaction with an automatic transmission. In addition, the inaccuracies in determining the torque supplied by the internal combustion engine may lead to increased fuel consumption since large safety margins must be observed in the application of operating limits for different operating types. Monitoring of the internal combustion engine with a view toward an unintentionally high torque output by the internal combustion engine is barely able to be implemented.

German Published Patent Application No. 197 49 434 describes a method for controlling an internal combustion engine in which the torque output by the internal combustion engine is determined with the aid of a pressure sensor, which records the pressure in the combustion chamber of a cylinder, and an angle-of-rotation sensor, which records the position of the crankshaft. In order to individually record the torque for each cylinder of the internal combustion engine, a separate pressure sensor is required for each cylinder. Because of the pressure sensors required for each cylinder, the implementation of this method entails considerable expense.

SUMMARY

Example embodiments of the present invention may provide a simplified and nevertheless precisely working method for recording the method of operation and/or the torque contribution of each cylinder of an internal combustion engine, e.g., an internal combustion engine having DGI or an internal combustion engine operating according to the diesel method.

According to an example embodiment of the present invention, a method is provided in which angle of rotation $\theta(t)$ of the crankshaft of the internal combustion engine is recorded with high resolution as to time, the second derivation with respect to time ($d^2\theta/dt^2$) of angle of rotation $\theta(t)$ of the crankshaft being determined in all power cycles of the cylinders of the internal combustion engine, and the second derivation with respect to time ($d^2\theta/dt^2$) of angle of rotation $\theta(t)$ is analyzed for each power cycle of a cylinder of the internal combustion engine.

An aspect of the method according to example embodiments of the present invention is that pressure sensors in the combustion chambers of the internal combustion engine may be completely dispensed with. Due to the highly time-resolved measurement of the angle of rotation of the crankshaft and the evaluation of the measured data, the operating state of each cylinder is able to be recorded, and possible malfunctions such as ignition misses, torque jumps, ringing or knocking and others may be assigned to the affected cylinder(s). As a result, in many cases, it is often possible to compensate for the malfunction of the affected cylinders by suitable adaptation of the triggering of the particular cylinders, for instance in the form of modified injection quantities and/or injection timing.

In addition, upon occurrence of a malfunction, it is possible to store an error report in the control device of the internal combustion engine. Furthermore, it is possible to ascertain the torque contribution of each cylinder separately.

Due to the monitoring of the functioning of each individual cylinder, the regulation or control of the internal combustion engine is able to be implemented very rapidly and with high regulation quality. Furthermore, because of the simplicity of the method, the application of a control device operating according to the method to various internal combustion engines may be simplified considerably.

In addition, the quantity of the fuel to be injected, the start of injection and/or the ignition angle of the internal combustion engine are influenced for the control of the torque supplied by the internal combustion engine. Still other actuating variables of the internal combustion engine such as the charge pressure also may be controlled by the control of the internal combustion engine.

Each power cycle of a cylinder may be assigned an angle of rotation range of the crankshaft. This may make it easy to assign the rotational speed gradient within an angle of rotation range to a cylinder.

Furthermore, position and size of the angle of rotation range relative to the position of the crankshaft may be specified by the control device as a function of the operating point of the internal combustion engine. This may have the result that the particular angle of rotation range is analyzed in all operating points within which the affected cylinder supplies a torque contribution when operating properly. This torque contribution is rendered during the power cycle of the cylinder. In other words: The aforementioned angle of rotation range constitutes a portion of the power cycle, which in an internal combustion engine operating according to the four-stroke method encompasses a 180° arc of crankshaft rotation.

The analysis of the time characteristic of the second derivation with regard to time of the angle of rotation for each power cycle of the cylinder of the internal combustion engine may be implemented in a variety of manners. For example, in the event of an abrupt change in the second time derivation of the angle of rotation within a power cycle, a malfunction of the cylinder such as knocking or ringing may be inferred.

On the other hand, it is also possible to determine whether, and to what extent, the cylinders of an internal combustion engine render a torque contribution. For example, if the rotational speed of the internal combustion engine decreases during a power cycle, the second time derivation of the angle of rotation during this power cycle will therefore be smaller than zero. This means nothing else but that the particular cylinder renders no torque contribution and that a malfunction may have occurred.

Furthermore, it is possible to infer mean indicated pressure $P_{mi}$ of the affected cylinder from the time characteristic of the second derivation according to the time of the angle of rotation within a power cycle. This information may be analyzed and utilized in the control and regulation of the internal combustion engine. The correlation between the characteristic of the second derivation as to time of the angle of rotation of the crankshaft and the mean induced pressure, or the torque contribution that is attributable to this mean induced pressure, is able to be determined with the aid of a characteristic field as a function of the operating point of the internal combustion engine.

From the information about the functioning of the individual cylinders obtained, the control of the internal combustion engine is able to be adapted accordingly, e.g., with respect to the start of injection, the injection duration, the exhaust gas recirculation rate and/or the ignition angle.

The method may be utilizable especially for the control of internal combustion engines operating according to the Otto method, e.g., having direct injection and/or variable valve lift, and for the control of internal combustion engines operating according to the diesel method.

An internal combustion engine, e.g., an internal combustion engine having direct injection and/or variable valve lift and operating according to the Otto method, or internal combustion engines operating according to the diesel method, may include at least one cylinder and a control device to control the internal combustion, in that a device is provided for recording, with high resolution as to time, the angle of rotation of the crankshaft of the internal combustion engine, and the control device operating according to the method described herein. The previously mentioned aspects of the method are fully utilized in this internal combustion engine.

According to an example embodiment of the present invention, a method for detecting an operating state of cylinders of an internal combustion engine includes: detecting a time characteristic of an angle of rotation of a crankshaft of the internal combustion engine; determining a second time derivation of the angle of rotation of the crankshaft in all working cycles of the cylinders of the internal combustion engine; and evaluating the second time derivation of the angle of rotation for each working cycle of a cylinder of the internal combustion engine.

An angle of rotation range of the crankshaft may be assigned to each working cycle of a cylinder.

A position of the angle of rotation ranges relative to a position of the crankshaft may be specified as a function of the operating point of the internal combustion engine.

A position of the angle of rotation ranges relative to a position of the crankshaft may be specified as a function of a rotational speed and a torque supplied by the internal combustion engine.

A size of the angle of rotation ranges may be specified as a function of the operating point of the internal combustion engine.

A size of the angle of rotation ranges may be specified as a function of at least one of the rotational speed and the torque supplied by the internal combustion engine.

A malfunction of an affected cylinder may be inferred if at least one abrupt change occurs in the second time derivation of the angle of rotation within a working cycle.

A malfunction of an affected cylinder may be inferred upon occurrence of at least one significant deviation of the second time derivation of the angle of rotation of a cylinder from the second time derivations of the angles of rotation, ascertained during a same working cycle, during the working cycles of remaining cylinders of the internal combustion engine.

A working cycle in an internal combustion engine operating according to a four stroke method may correspond to a crank angle of 720°.

Torque supplied by a cylinder may be ascertained as a function of the second time derivation of the angle of rotation of a cylinder.

A correlation between the torque supplied by a cylinder and the second time derivation of the angle of rotation of a cylinder may be determined in a characteristic field as a function of the operating point of the internal combustion engine.

At least one of (a) a quantity of fuel to be injected, (b) a start of injection, (c) an exhaust-gas recirculation rate and (d) an ignition angle of the internal combustion engine may be influenced for control of torque supplied by the internal combustion engine.

The internal combustion engine may be adapted to operate according to at least one of (a) an Otto method, (b) an Otto method having direct injection and (c) an Otto method having variable lift.

The internal combustion engine may be adapted to operating according to a diesel method and having direct injection.

According to an example embodiment of the present invention, a control device is for a fuel injection system of an internal combustion engine. The control device is adapted to perform a method that includes: detecting a time characteristic of an angle of rotation of a crankshaft of the internal combustion engine; determining a second time derivation of the angle of rotation of the crankshaft in all working cycles of cylinders of the internal combustion engine; and evaluating the second time derivation of the angle of rotation for each working cycle of a cylinder of the internal combustion engine.

According to an example embodiment of the present invention, a computer program includes program code for executing a method for detecting an operating state of cylinders of an internal combustion engine. The method includes: detecting a time characteristic of an angle of rotation of a crankshaft of the internal combustion engine; determining a second time derivation of the angle of rotation of the crankshaft in all working cycles of the cylinders of the internal combustion engine; and evaluating the second time derivation of the angle of rotation for each working cycle of a cylinder of the internal combustion engine.

The computer program may be stored on a storage medium.

The computer program may be stored on a CD-ROM.

According to an example embodiment of the present invention, an internal combustion engine includes: at least one cylinder; a control device adapted to control the internal combustion engine; and a device adapted to record an angle of rotation of a crankshaft of the internal combustion engine, with high resolution as to time. The control device is adapted to perform a method for detecting an operating state of the cylinder of the internal combustion engine, the method including: detecting a time characteristic of the angle of rotation of the crankshaft of the internal combustion engine; determining a second time derivation of the angle of rotation of the crankshaft in all working cycles of the cylinders of the internal combustion engine; and evaluating the second time derivation of the angle of rotation for each working cycle of a cylinder of the internal combustion engine.

The internal combustion engine may be adapted to operate at lest one of (a) according to an Otto method, having at least one of (a) direct injection and (b) variable valve lift, and (b) according to a diesel principle.

Additional features and aspects of example embodiments of the present invention are described in more detail below with reference to the appended Figures.

DETAILED DESCRIPTION

Figure 1:
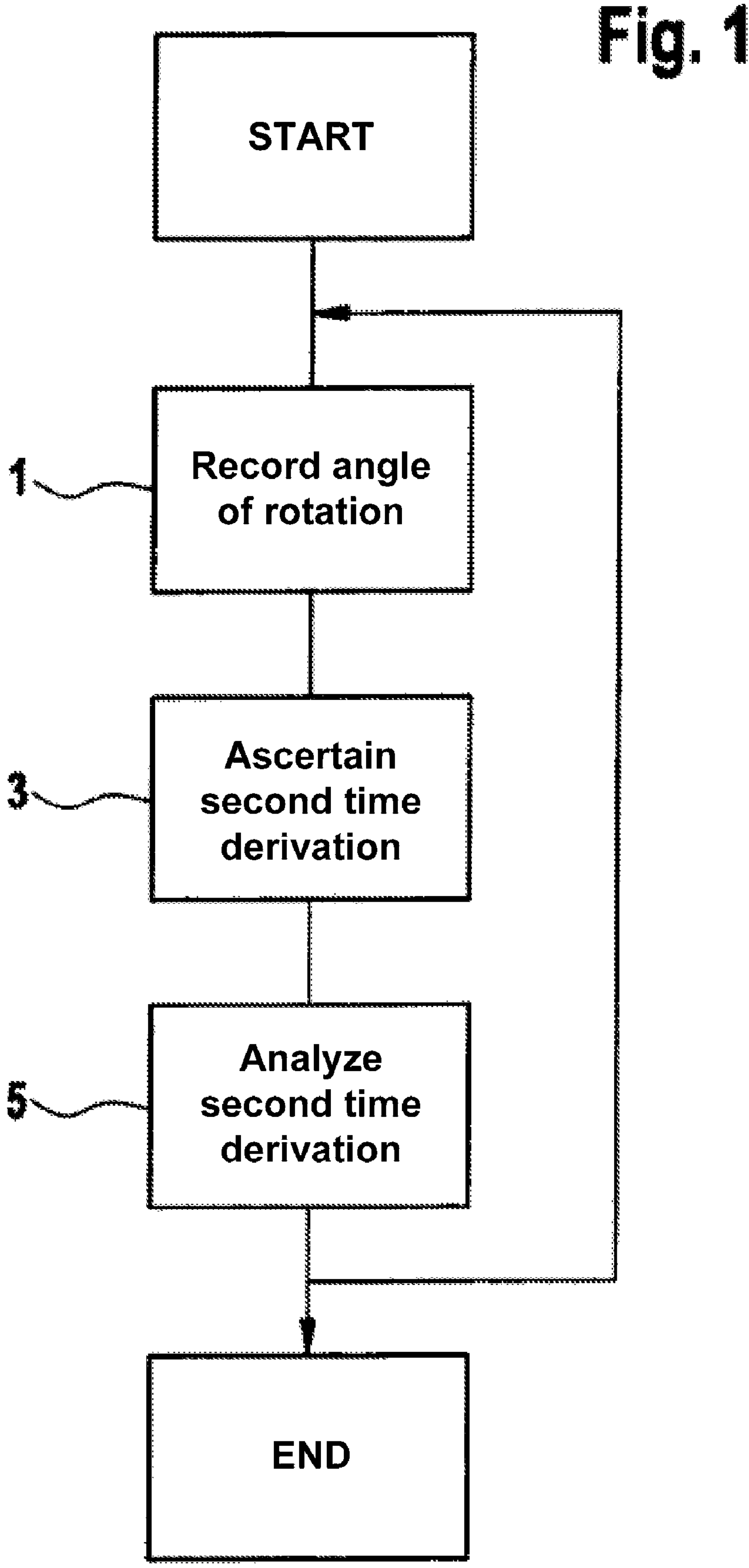
FIG. 1 is a flow chart of a method according to an example embodiment of the present invention.

The method begins in a start block. Subsequently, the angle of rotation of the crankshaft of the internal combustion engine is recorded in a first step 1. It should be understood that this may be done with sufficiently high resolution since changes in the rotational speed of the crankshaft within an angle of rotation range of 30° to 60° crankshaft, for example, may ultimately be analyzed. A resolution of 1° crank angle may be sufficient for many applications.

In a second step 3, the second derivation according to time of the angle of rotation of the crankshaft is ascertained in all power cycles of the cylinders of the internal combustion engine. In the conventional definition of an internal combustion engine operating according to the four-stroke method, a crank angle of 720° is assigned to a working cycle. This angle of 720° is subdivided into four cycles each having a 180° crank angle. However, the method hereof does not require the recording of the entire power cycle across 180°. Instead, it is possible to analyze only a portion of a working cycle. This section is denoted as angle of rotation range in the present context. The angle of rotation range of approximately 30° to 70° crank angle may be encompassed within the power cycle. This reduces the data quantity, but may have no adverse effect on the quality of the obtained information.

The position and size of this window within the power cycle are modified as a function of the operating point.

In a third step 5, the characteristic of the second time derivation of the angle of rotation is analyzed for each power cycle of a cylinder of the internal combustion engine. This analysis may be carried out in a wide variety of manners. For instance, an ignition miss may be diagnosed if the second time derivation of the angle of rotation in the analyzed angle of rotation range is smaller than zero since the rotational speed of the internal combustion engine decreases. In other words: The particular cylinder renders no torque contribution in the power cycle in question. Another possibility of analyzing the second time derivation of the angle of rotation consists of comparing this variable with reference variables that are ascertained in bench testing of engines having an identical design.

Furthermore, it is also possible to arrive at statements regarding the functioning of the individual cylinders by comparing the second derivations of the angles of rotation, determined within a working cycle in the power cycles of the individual cylinders of an internal combustion engine. Identical operating conditions prevail in all cylinders within a working cycle.

For instance, if the second time derivations of all cylinders are substantially identical within a working cycle and the second time derivation of the angle of rotation of only one cylinder deviates significantly from the values of the other cylinders, a malfunction of this individual cylinder may be inferred. For example, on the basis of abrupt changes in the second time derivation of the angle of rotation, insufficient combustion or knocking processes in the combustion chamber may be assumed as well.

After third step 5 has been processed, the method begins anew with first step 1. If the internal combustion engine is switched off, the method is terminated as well.

Figure 2:
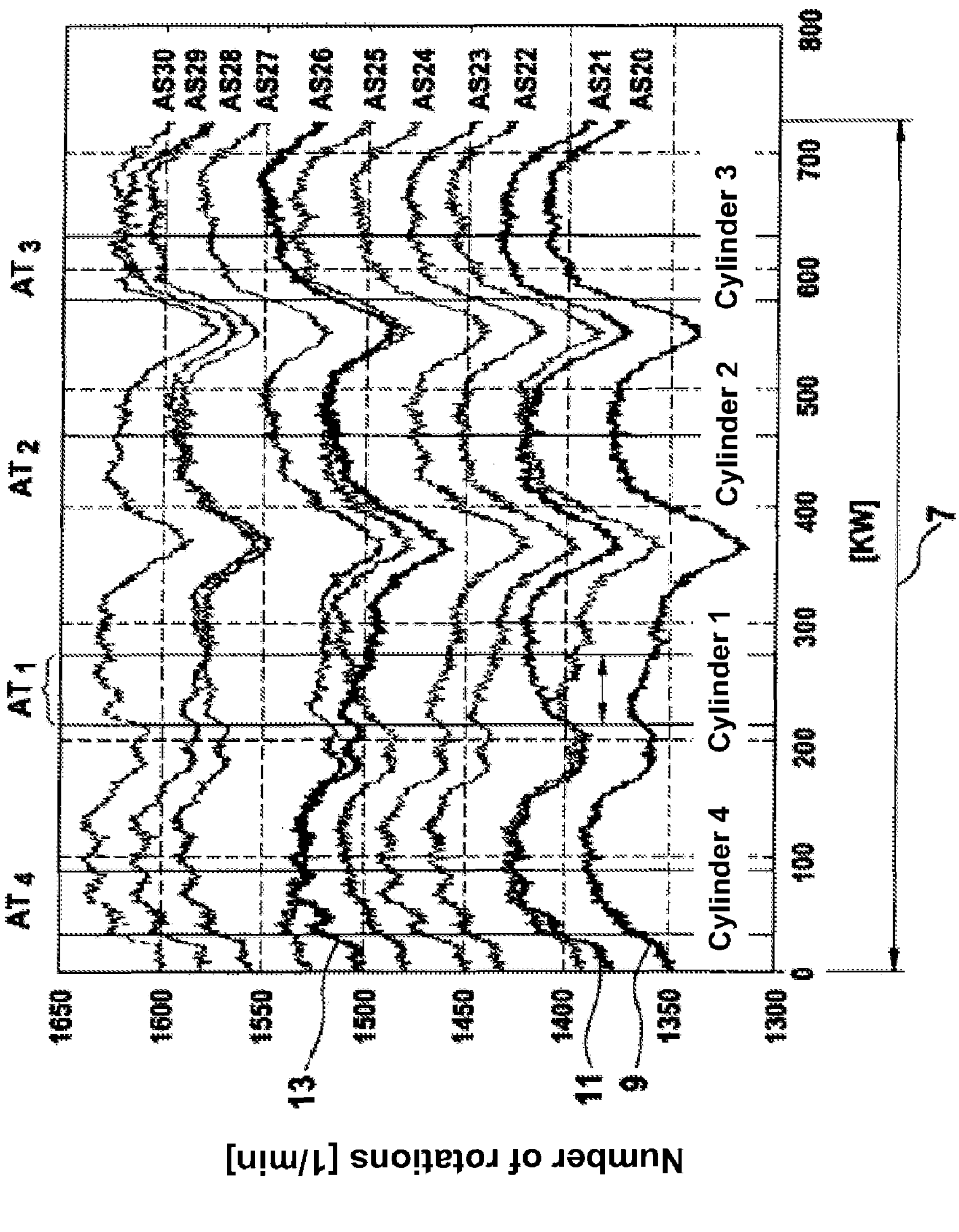
FIG. 2 illustrates the characteristic of the rotational speed of an internal combustion engine across a plurality of working cycles.

In FIG. 3, the rotational speed of an internal combustion engine having four cylinders is plotted over the crank angle. The X-axis of FIG. 2 encompasses a working cycle corresponding to a crank angle of 720°. In FIG. 2, the working cycle is marked by a double arrow bearing reference numeral 7.

The angle of rotation ranges of the power cycles of cylinders 1 to 4 are denoted by $AT_1$ to $AT_4$ in FIG. 2. In FIG. 2, first the working cycle AS20 is elucidated in greater detail. Working cycle AS20 is represented by a first line 9.

When examining working cycle 20, it becomes apparent that the rotational speed of the internal combustion engine increases due to the torque supplied by cylinder 4 during working cycle $AT_4$ of cylinder 4. At the beginning of angle of rotation range $AT_4$, it amounts to approximately 1,360/min, and at the end of angle of rotation range $AT_4$ it amounts to approximately 1,385/min.

In the subsequent angle of rotation range $AT_1$ of cylinder 1, the rotational speed of internal combustion engine cylinder 1 decreases slightly. At the beginning of angle of rotation range $AT_1$, the rotational speed amounts to approximately 1,365/min, while it drops to approximately 1,356/min at the end of angle of rotation range $AT_1$. This means nothing more than that cylinder 1 renders no torque contribution. This may be attributed to, for instance, insufficient mixture formation or no available ignition spark or some other reason. In other words: A malfunction of cylinder may be inferred just by comparing the angle of rotation ranges $AT_4$ and $AT_1$ within working cycle AS20.

In cylinders 2 and 3, or the associated angle of rotation ranges $AT_2$ and $AT_3$, the rotational speed of the crankshaft is increasing again. The information that cylinders 2 and 3 are working properly may be gleaned therefrom.

In FIG. 2, various working cycles are plotted on top of one another. For instance, a second line 11, which represents working cycle AS21 of the internal combustion engine, is plotted above first line 9. Line 11 begins at 0° crank angle, i.e., at the origin of the X-axis having the same value that line 9 has at the end of working cycle 20, that is to say, 720°.

If one then examines working cycles AT4, AT1, AT2 und AT3 in working cycle 21 once again, it becomes clear that the rotational speed of the crankshaft is increasing in all power cycles. In other words: Cylinder 1 is functioning again during working cycle 21.

From among working cycles 22 through 30, working cycle AS 26 is plotted by reference numeral 13 for a third line 13 in FIG. 2. In working cycle AS 26, the fourth cylinder is noticeable in that the rotational speed within angle of rotation range $AT_4$ is subject to certain fluctuations and does not rise monotonously. A less than optimal combustion of the fuel-air mixture may be inferred from this. In working cycle AS 26, cylinder 1 does not render any significant torque contribution, which is reflected in the reduced rotational speed of the crankshaft in angle of rotation range $AT_1$.

Cylinders 2 and 3 work satisfactorily in working cycle 26 as well.

By comparing the changes in the rotational speeds within angle of rotation ranges $AT_1$ to $AT_4$ during a working cycle, as explicitly elucidated with the aid of working cycles 20, 21 and 26, it becomes clear that the evaluation of the changes in the rotational speed during the working cycles provides valuable information regarding the functioning of the individual cylinders. In this context only the signals of an already present angle of rotation sensor on the crankshaft may need to be analyzed.

Figure 3A:
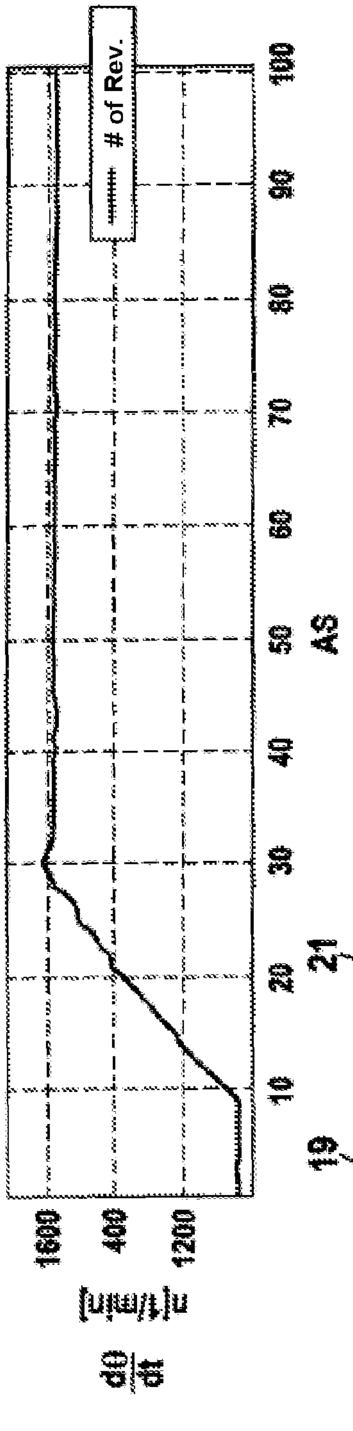
FIGS. 3*a*-3*c* illustrates the correlation between rotational speed, mean indicated pressure and the second time derivation of the angle of rotation of the crankshaft, for comparison.

In FIG. 3*a*, rotational speed $n=d\theta/dt$ of an internal combustion engine is plotted across 100 working cycles. The rotational speed begins at 1,100/min and increases to 1,600/min between the ninth working cycle and the thirtieth working cycle. The rotational speed then remains constant until the hundredth working cycle.

Figure 3B:
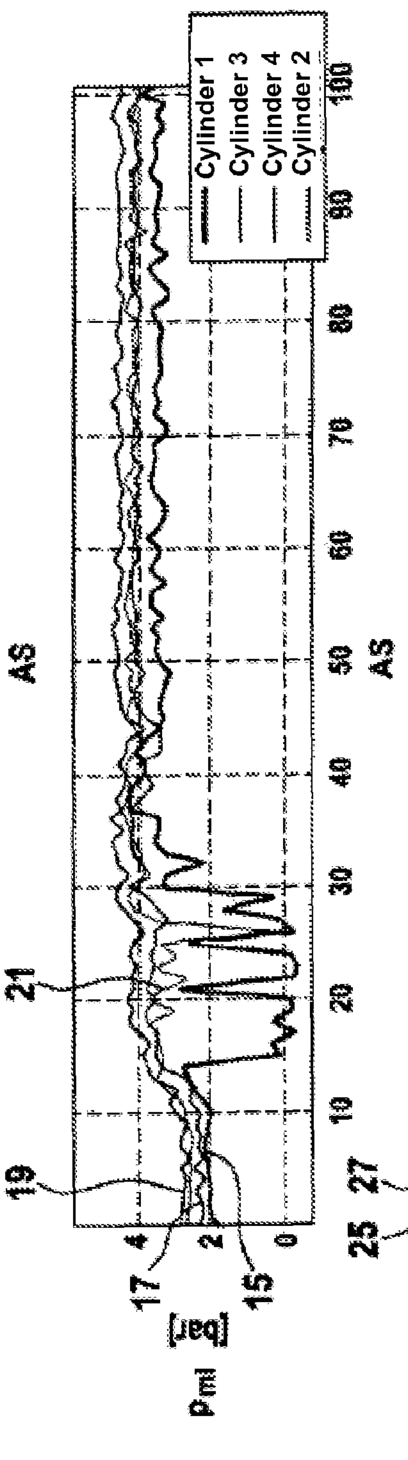

In FIG. 3*b*, associated mean indicated pressure $P_{mi}$ of cylinders 1 through 4 is represented by lines 15, 17, 19 and 21, respectively.

Figure 3C:
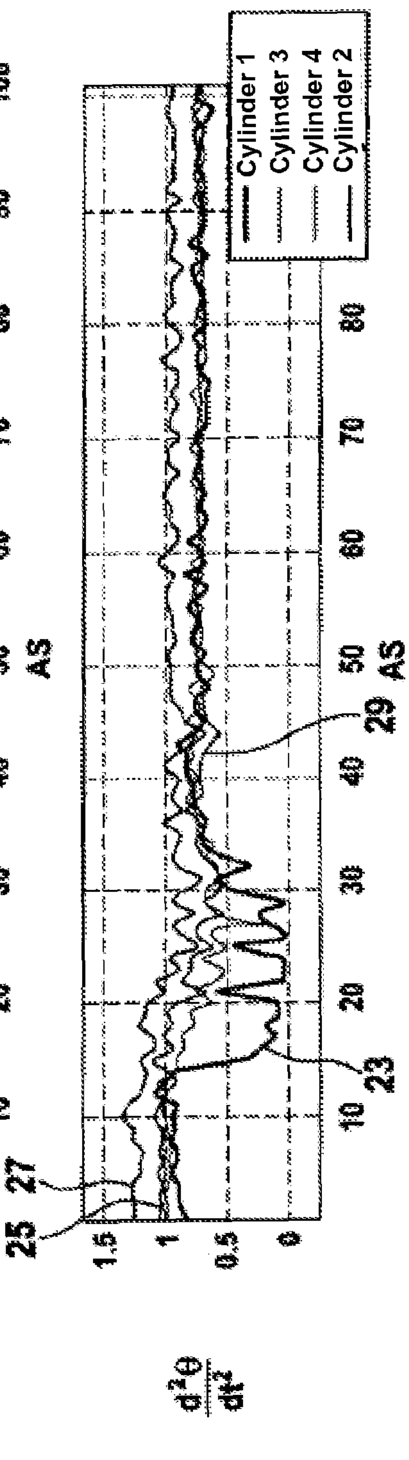

In FIG. 3*c*, four lines 23, 25, 27 and 29 are plotted. Line 23 is formed by plotting the changes in the rotational speed within angle of rotation range $AT_1$ across working cycles 0 through 100. The same applies analogously to lines 25, 27 and 29 and angle of rotation ranges $AT_2$ through $AT_4$.

During the acceleration phase, i.e., within working cycles 10 through 30, line 23, which is assigned to cylinder 1, exhibits distinctive features compared to lines 25, 27 and 29. These distinctive features are that the cylinder is operating properly only in working cycles 10 through 13, 21, 25 and 27, whereas cylinder 1 renders no significant torque contribution during the other working cycles.

As a result, FIG. 3*c* makes clear how inferences regarding the functioning of the individual cylinders of an internal combustion engines may be made by evaluating the signal of an angle of rotation sensor on the crankshaft.

By comparing lines 15, 17, 19 and 21 from FIG. 3*b* and lines 23, 25, 27 and 29 from FIG. 3*c*, it also becomes apparent that a very direct correlation exists between mean indicated pressure $P_{mi}$ and the changes in rotational speed during the working cycles. This can be seen clearly in the region of working cycles 10 TO 35, in particular. Due to this direct correlation, one is able, possibly with the aid of a characteristic field, to infer the mean indicated pressure in the internal combustion engine from the changes in the rotational speed of the crankshaft. Via the mean indicated pressure and the position of the crankshaft, the torque contribution of the individual cylinder is ascertainable in a simple and very precise manner. Using the method, it is therefore possible to determine the torque contribution in a cylinder-individual manner merely by suitable evaluation of the output signals of the angle of rotation sensor of the crankshaft, and to calculate the indicated engine torque of the internal combustion engine in this manner. Furthermore, as already described, it is possible to detect malfunctions of individual cylinders as well and to adapt the control of this cylinder on the basis of the obtained information until satisfactory functioning of the cylinder is achieved.

What is claimed is:

1. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein:

an angle of rotation range of the crankshaft is assigned to each working cycle of a cylinder; and a position of the angle of rotation ranges relative to a position of the crankshaft is specified as a function of the operating point of the internal combustion engine.

2. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein:

an angle of rotation range of the crankshaft is assigned to each working cycle of a cylinder; and a position of the angle of rotation ranges relative to a position of the crankshaft is specified as a function of a rotational speed and a torque supplied by the internal combustion engine.

3. The method according to claim 2, wherein a size of the angle of rotation ranges is specified as a function of at least one of the rotational speed and the torque supplied by the internal combustion engine.

4. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein:

an angle of rotation range of the crankshaft is assigned to each working cycle of a cylinder; and a size of the angle of rotation ranges is specified as a function of the operating point of the internal combustion engine.

5. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein a malfunction of an affected cylinder is inferred if at least one abrupt change occurs in the second time derivation of the angle of rotation within a working cycle.

6. The method according to claim 5, wherein torque supplied by a cylinder is ascertained as a function of the second time derivation of the angle of rotation of the cylinder.

7. The method according to claim 5, wherein at least one of (a) a quantity of fuel to be injected, (b) a start of injection, (c) an exhaust-gas recirculation rate and (d) an ignition angle of the internal combustion engine is influenced for control of torque supplied by the internal combustion engine.

8. The method according to claim 5, wherein the internal combustion engine is adapted to operate according to at least one of (a) an Otto method, (b) an Otto method having direct injection, (c) an Otto method having variable lift, and (d) a diesel method having direct injection.

9. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein a malfunction of an affected cylinder is inferred upon occurrence of at least one significant deviation of the second time derivation of the angle of rotation of a cylinder from the second time derivations of the angles of rotation, ascertained during a same working cycle, during the working cycles of remaining cylinders of the internal combustion engine.

10. The method according to claim 9, wherein a working cycle in an internal combustion engine operating according to a four stroke method corresponds to a crank angle of 720°.

11. The method according to claim 9, wherein the internal combustion engine is adapted to operate according to at least one of (a) an Otto method, (b) an Otto method having direct injection and (c) an Otto method having variable lift.

12. The method according to claim 9, wherein the internal combustion engine is adapted to operating according to a diesel method and having direct injection.

13. The method according to claim 9, wherein torque supplied by a cylinder is ascertained as a function of the second time derivation of the angle of rotation of a cylinder.

14. The method according to claim 9, wherein at least one of (a) a quantity of fuel to be injected, (b) a start of injection, (c) an exhaust-gas recirculation rate and (d) an ignition angle of the internal combustion engine is influenced for control of torque supplied by the internal combustion engine.

15. A method for detecting an operating state of cylinders of an internal combustion engine, comprising:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein:

torque supplied by a cylinder is ascertained as a function of the second time derivation of the angle of rotation of the cylinder; and a correlation between the torque supplied by the cylinder and the second time derivation of the angle of rotation of the cylinder is determined in a characteristic field as a function of the operating point of the internal combustion engine.

16. A control device for a fuel injection system of an internal combustion engine, the control device adapted to perform a method that includes:

detecting a time characteristic of an angle of rotation of a crankshaft of the internal combustion engine;

determining a second time derivation of the angle of rotation of the crankshaft in all working cycles of cylinders of the internal combustion engine; and evaluating the second time derivation of the angle of rotation for each working cycle of a cylinder of the internal combustion engine;

wherein a malfunction of an affected cylinder is inferred at least one of: (a) if at least one abrupt change occurs in the second time derivation of the angle of rotation within a working cycle; and (b) upon occurrence of at least one significant deviation of the second time derivation of the angle of rotation of a cylinder from the second time derivations of the angles of rotation, ascertained during a same working cycle, during the working cycles of remaining cylinders of the internal combustion engine.

17. A hardware-implemented computer-readable medium having stored thereon program code adapted to be executed by a processor, the instructions which, when executed, cause the processor to perform a method for detecting an operating state of cylinders of an internal combustion engine, the method including:

detecting a time characteristic of an angle of rotation of a crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein a malfunction of an affected cylinder is inferred at least one of: (a) if at least one abrupt change occurs in the second time derivation of the angle of rotation within a working cycle; and (b) upon occurrence of at least one significant deviation of the second time derivation of the angle of rotation of a cylinder from the second time derivations of the angles of rotation, ascertained during a same working cycle, during the working cycles of remaining cylinders of the internal combustion engine.

18. The computer-readable medium according to claim 17, wherein the computer-readable medium is a CD-ROM.

19. An internal combustion engine, comprising:

at least one cylinder;

a control device adapted to control the internal combustion engine; and a device adapted to record an angle of rotation of a crankshaft of the internal combustion engine, with high resolution as to time;

wherein the control device is adapted to perform a method for detecting and operating state of the cylinder of the internal combustion engine, the method including:

detecting a time characteristic of the angle of rotation of the crankshaft of the internal combustion engine;

determining a second time derivation of the angle of rotation of the crankshaft of the internal combustion engine;

determining a second time derivation of the angle of rotation of the crankshaft in all working cycles of the cylinders of the internal combustion engine; and evaluating the second time derivation of the angle of rotation for each working cycle of a cylinder of the internal combustion engine;

wherein a malfunction of an affected cylinder is inferred at least one of: (a) if at least one abrupt change occurs in the second time derivation of the angle of rotation within a working cycle; and (b) upon occurrence of at least one significant deviation of the second time derivation of the angle of rotation of a cylinder from the second time derivations of the angles of rotation, ascertained during a same working cycle, during the working cycles of remaining cylinders of the internal combustion engine.

20. The internal combustion engine according to claim 19, wherein the internal combustion engine is adapted to operate at lest one of (a) according to an Otto method, having at least one of (a) direct injection and (b) variable valve lift, and (b) according to a diesel principle.

* * * * *